F. B. GILBRETH.
APPARATUS FOR MEASURING AND FEEDING MATERIALS.
APPLICATION FILED NOV. 24, 1902.
1,014,645.
Patented Jan. 16, 1912.
4 SHEETS—SHEET 2.
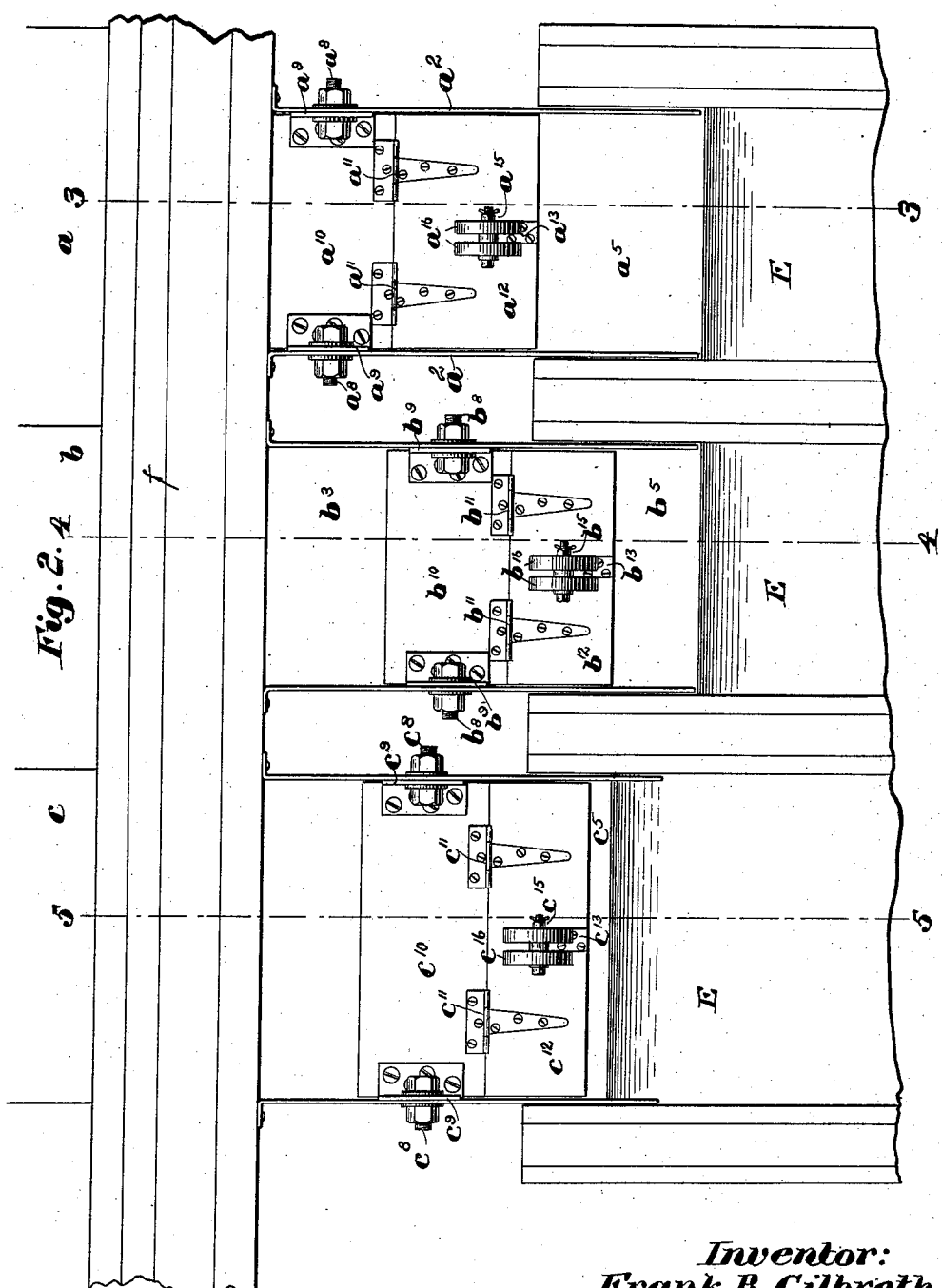
Witnesses:
Everett S. Emery
Alvin R. Brown
Inventor:
Frank B. Gilbreth,
by
Atty.

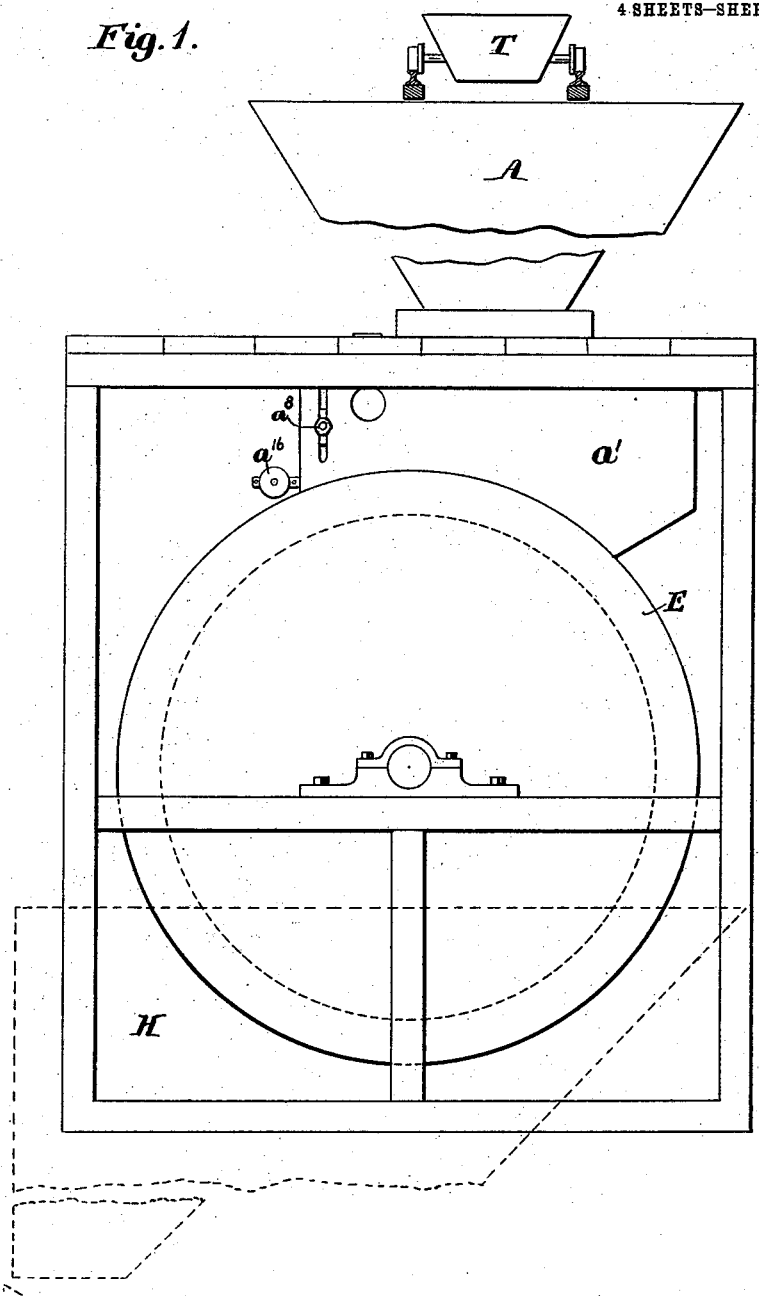

F. B. GILBRETH.
APPARATUS FOR MEASURING AND FEEDING MATERIALS.
APPLICATION FILED NOV. 24, 1902.
1,014,645.
Patented Jan. 16, 1912.
4 SHEETS—SHEET 3.
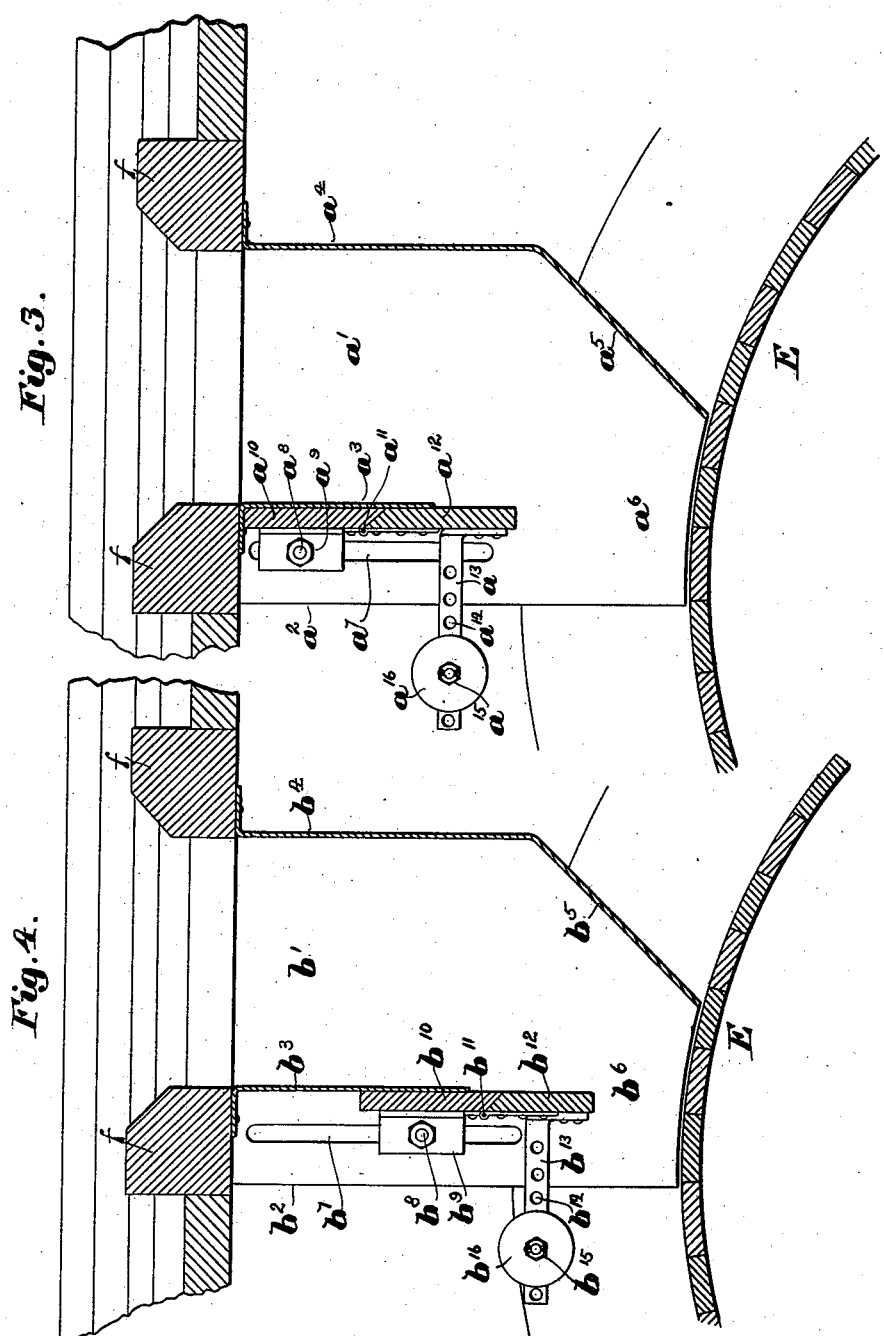
Witnesses:
Inventor:
Frank B. Gilbreth,
by
Atty.

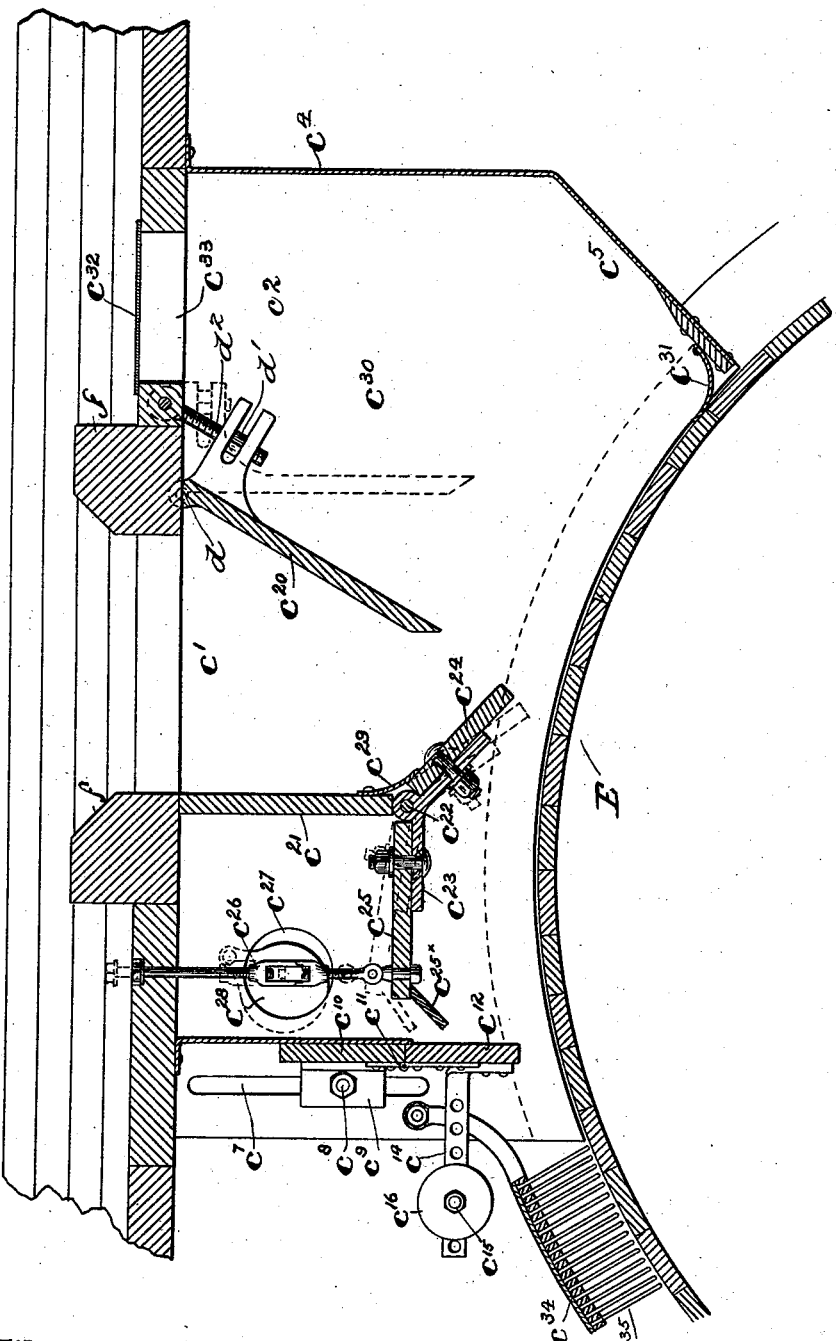

UNITED STATES PATENT OFFICE.

FRANK B. GILBRETH, OF BOSTON, MASSACHUSETTS.

APPARATUS FOR MEASURING AND FEEDING MATERIALS.

1,014,645. Specification of Letters Patent. Patented Jan. 16, 1912.

Application filed November 24, 1902. Serial No. 132,520½.

*To all whom it may concern:*

Be it known that I, FRANK B. GILBRETH, a citizen of the United States, residing at Boston, in the county of Suffolk and State of Massachusetts, have invented an Improvement in Apparatus for Measuring and Feeding Materials, of which the following description, in connection with the accompanying drawings, is a specification, like letters on the drawings representing like parts.

My invention relates to apparatus for measuring and feeding materials, such, for example, as are used in the composition of concrete and the like, the apparatus being especially useful in connection with concrete mixers of the various types now in use.

In the mixing of concrete it is desirable to control with accuracy the proportions of stone, sand and cement that are mixed together in the formation of the concrete composition, and it is equally desirable, especially when a gravity type of mixer is employed, to permit the stone, sand and cement to flow continuously to and through the mixer, in which event the rates of flow determine the proportions of the various parts when mixed together. In an apparatus of this type the greatest difficulty is encountered in controlling the flow of the cement which is usually very finely comminuted, amounting almost to an impalpable powder, and one of the principal aims of my present invention is to provide means for controlling the flow of this fine, dust-like substance. This feature of my invention, as well as various other features thereof, will best be understood from a description of one form of apparatus made in illustration thereof.

Of the accompanying drawings,—Figure 1 in end elevation shows an apparatus illustrating one embodiment of my invention; Fig. 2 an enlarged detail in side elevation showing the outlets from the several hoppers where they meet the moving delivery surface or cylinder; Figs. 3 4 and 5, vertical longitudinal sections taken respectively on the dotted lines 3—3, 4—4, and 5—5, Fig. 2.

In the particular embodiment of my invention selected for illustration herein and shown in the drawings, $a$, $b$ and $c$ are hoppers to contain various materials to be mixed, such, for instance, as broken stone, sand and cement, there being arranged above these hoppers suitable facilities, as the tramway T, Fig. 1, for conveniently depositing in the hoppers the materials to be drawn therefrom. Below the outlets for these several hoppers I have provided a traveling delivery surface shown as and preferably in the form of a cylindrical surface presented by the cylinder E, having a left-handed rotation as viewed in the drawings arranged to be driven in suitable or convenient manner, not forming a part of my present invention and therefore not illustrated.

The hoppers referred to are made of varying capacities, according to the average proportions of materials to be mixed; for example, in the present instance, the sand hopper $b$ is slightly smaller than the broken stone hopper, $a$, and the cement hopper $c$ in turn is smaller than the sand hopper $b$, it having been found that in general practice more stone is used than sand, and more sand than cement. The capacities of these hoppers may however be varied as desired, to meet any particular use to which the apparatus is put.

As herein shown, the several hoppers referred to are mounted upon a suitable framework which includes the longitudinal stringers $f$ $f$ (see Figs. 3 to 5, inclusive) and below each hopper is arranged an outlet spout or chamber, which for convenience I prefer to make of sheet metal. Referring, for instance, to Fig. 3, the outlet, $a'$, for the hopper $a$ is composed of the metallic side plates, $a^2$, $a^2$, depending from the stringers $f$ $f$ and connected by the front and back walls $a^3$, $a^4$, the latter of which may for convenience be formed integrally with the said side walls. The back wall $a^4$ has near its bottom a portion, $a^5$, inclined in the direction of rotation of the cylinder E to facilitate delivery of materials onto the surface of the said cylinder while the latter is in rotation. The front wall, $a^3$, of the spout as herein shown, terminates at a considerable distance above the cylinder E to provide between its lower edge and the said cylinder a delivery or discharge opening, $a^6$, through which the materials may escape onto the moving cylinder. The side walls, $a^2$, of the spout project at their front edges beyond the front wall, $a^3$, their projecting portions being vertically slotted at $a^7$ to receive the clamping devices, shown as bolts, $a^8$, which secure the brackets, $a^9$, in vertically adjusted position. These brackets support the cross-member, $a^{10}$, conveniently of wood, to the lower edge of which is hinged at $a^{11}$ a safety gate, $a^{12}$, to the outer face of which is secured an arm $a^{13}$, provided with a series of openings, $a^{14}$, which receive the bolt, $a^{15}$, carrying the counter weight or weights, $a^{16}$.

Vertical adjustment of the brackets, $a^9$, and the cross-member, $a^{10}$, varies the area of the discharge opening, $a^6$, from the spout, $a'$, thus furnishing a means for adjusting such discharge opening according to the requirements of the work immediately in hand. The gate, $a^{12}$, however, has the capacity to swing outward to permit the material to free itself if choked, or to permit the escape of any obstruction which if prevented from escaping would vary the proportion of the material being fed. Adjustment of the counter-weight or weights, $a^{16}$, along the supporting arm, $a^{18}$, furnishes means for adjusting the pressure or force tending to restrain this safety gate from swinging.

The construction of the discharge spout and safety gate for the intermediate hopper $b$ is similar to that of $a$, similarly indexed reference letters being employed to designate corresponding parts thereof. The delivery spout, $c'$, for the cement hopper, $c$, is however preferably quite different in construction from that of the other hoppers, because of the entirely different dust-like character of the material to be controlled. For example, while it is possible and desirable with the broken stone and sand to divert it in the direction of rotation of the cylinder E to facilitate the flow of the materials therefrom and which may be done without losing control of said materials, with the dust-like cement it is impossible so to divert or direct the same upon the rotating cylinder in the direction of rotation thereof, for the finely divided character of the cement is such that it is likely at any time to slide outward from the hopper in a body, and beyond the control of devices such as would control the flow of the other materials. Accordingly, the cement spout, $c'$, is provided with a rear preferably forwardly inclined or directed wall, $c^{20}$, which throws the cement toward an opposed front-guard wall, $c^{21}$. To the lower end of the guard wall $c^{21}$ is hinged at $c^{22}$ a two-arm bracket or member $c^{23}$, to one of the arms of which is secured the adjustable deflecting wall, $c^{24}$, and to the other arm of which is secured an operating member, $c^{25}$, which may be a simple arm or board-like member extending from one to the opposite end of the spout chamber $c'$.

A turn-buckle adjustment $c^{26}$ connects the member $c^{25}$ with the stationary part of the apparatus whereby the inclination or deflection of the member $c^{24}$ may be adjusted at will. Access to the turn-buckle may be had through the hand hole $c^{27}$ in the side wall $c^2$ of the spout and normally closed by a removable or hinged cover $c^{28}$. Against the upper edge of the adjustable deflecting member $c^{24}$ rests a leather or other flap $c^{29}$, secured to the front guard wall $c^{21}$ and covering the hinge, $c^{22}$, and hinge space. The rear wall, $c^4$, of the spout, is carried to the rear to leave between it and the deflecting wall, $c^{20}$, a relatively large settling and separating chamber, $c^{30}$, and the rear and side walls are provided with a flap, $c^{31}$, shown principally in dotted lines resting upon the rotating cylinder E to form a tight joint thereat. The cement gravitating downward through the spout, $c'$, instead of being directed upon the moving cylinder in the direction of rotation thereof, is directed by the inclined rear wall $c^{20}$ first toward the front guard wall, $c^{21}$, and then again rearwardly by the adjustable deflector, $c^{24}$, into the separating and settling chamber, $c^{30}$, which it enters in a direction opposed to the direction of rotation of the cylinder and meeting the latter upon the ascending face or wall thereof. This tortuous path tends to prevent the cement sliding bodily out from the hopper and free from the control of the controlling devices. I have found also that there is likely to be considerable air mixed with and carried by the cement and which it is desirable to free in order that the cement may be conveniently handled; which is not possible where air is mixed therewith. This I accomplish in the settling and freeing chamber, $c^{30}$ which is provided at its top with an outlet opening, $c^{33}$, normally closed by a very fine screen, $c^{32}$, which may be of cloth. The cement directed into this chamber $c^{30}$ is retained therein a sufficient time to permit the air to escape therefrom and pass out through the opening $c^{32}$, the cement settling to the bottom, into contact with the moving wall of the cylinder E, by which it is carried forward and out past the safety gate $c^{12}$ in a manner similar to that described with reference to the other materials handled by the apparatus. To further guard against any possible loss of control of the cement, I have arranged in front of the safety gate $c^{12}$ a hinged plate $c^{34}$ provided with a plurality of inwardly extended bristles or projections $c^{35}$ extending close to the periphery of the rotating cylinder and through which the cement must pass to be free.

Were it not for the projection $c^{35}$, the cement issuing from the feed spout would be apt to break away in large bodies or masses rather than flow evenly and uniformly down upon and with the cylinder E into the hopper and mixer. The projections $c^{35}$ however, arranged as many as may be desired in any suitable location and embracing any suitable portion of the cylinder, serve to prevent this tendency of the cement to break up into masses and to compel it to flow or move uniformly and in a broken up and divided condition.

In the operation of the apparatus the stone, sand and cement are deposited by means of the tramway T or otherwise, in their respective hoppers, from which they gravitate upon the rotating cylinder E. The stone and sand issue through the spouts, Figs. 3 and 4, upon the cylinder E and pass with and under the control of the latter into the hopper H shown in dotted lines in Fig. 1, arranged below the cylinder. The swinging safety gates $a^{12}$ permit the issuance of any abnormal lumps or masses of foreign substance which, if not permitted to escape, would remain in position to interfere with the flow of materials from the spout and thereby vary the proportions of materials being mixed. The swinging safety gate by yielding for the escape of such lumps of the foreign matter, permits the escape thereof and immediately is restored to its normal position to preserve the proper rate of feed of material.

Referring to Fig. 5 the movement of the cement is quite different. Gravitating from the hopper it meets or is deflected toward and upon the swinging deflector $c^{24}$ which directs it rearwardly into the settling chamber $c^{30}$ which it enters in opposition to the moving cylinder surface, which tends to turn it over and agitate it and prevent it settling in unequal masses within said chamber. While being agitated therein the air largely escapes therefrom, the same passing outward through the opening $c^{33}$. The general effect of the settling chamber $c^{30}$ is moreover to retain the cement in what might be called a mild agitation or turning over for a sufficient time to eliminate any inequalities in mass or density or otherwise that might be found therein as a result of any inequality of gravitation from the hopper above, so that when it finally is carried by frictional contact with the cylinder under the deflector $c^{24}$, it is of substantially uniform density or texture and substantially free from such inequalities as would naturally be found therein were it permitted to pass thereafter directly from the hopper.

Any tendency of the material under excessive or unequal pressure to flow unduly past the swinging deflector $c^{24}$ will act automatically to swing the latter toward the surface of the cylinder and thereby counteract the tendency to excessive flow; in other words, the swinging deflector $c^{24}$ owing to the weight of the member $c^{25}$ and turn-buckle adjusting devices $c^{26}$, when properly adjusted, acts as an automatic gate to guard against excessive flow of cement out from the settling chamber $c^{30}$. Should the cement after having passed the swinging deflector $c^{24}$, tend to clog or accumulate in the spouts at the left thereof, Fig. 5, or should the action of the cement upon the swinging deflector $c^{24}$ alone be insufficient to cause it to respond and partially cut off the flow the cement will act upon the board $c^{25}$ at its under side and also upon the inclined lip $c^{25x}$ with which it is herein shown as provided, and lift the said board and further aid in closing partially the deflector $c^{24}$ and checking the flow.

I have herein shown means whereby the inclination of the wall, $c^{20}$, may be varied as desired to obtain the most perfect action within the settling chamber and to suit the varying requirements of different materials or other different conditions. This is effected by the provision of the hinged support $d$ for the deflecting wall, $c^{20}$, about which it may be moved to the desired angle and there secured by adjustment of the nut $d^1$ upon the threaded strut-like member $d^2$ pivotally secured to the frame or by any other suitable adjusting means. A screen $c^{32}$ closing the air opening $c^{33}$ should be of such fineness, preferably of fine cloth, and so secured that while permitting the escape of the air from the settling chamber it will effectually prevent escape of even the finest of the cement. The various materials passing down over and upon the cylinder into the hopper H are directed by the hopper into the mixing apparatus herein typified at M.

The principal advantage of my apparatus resides in the complete control obtained over the various materials and the resultant possibility of obtaining accurate proportions of materials in the concrete composition, together with the fact that a continuous flow or supply of these materials may be had as for use in connection with the gravity type of mixers, without sacrificing accuracy of proportion.

My invention is not restricted to the particular embodiment thereof herein disclosed, but obviously may be varied within the spirit and scope of the invention.

Having described my invention and without limiting myself to details, what I claim and desire to secure by Letters Patent is:—

1. The combination with a chute, of a moving delivery wall or surface therefor, a plate swingingly mounted above said wall and in a manner permitting it to swing toward the same to regulate the delivery of materials thereby, and means connected to the swinging plate at the rear thereof and adapted to be operated by the excess flow of materials beyond said plate whereby to cause the free edge of said plate to swing toward said delivery wall for the purpose set forth.

2. The combination with a chute, of a rotary delivery cylinder therefor, means for directing the flow of materials from said chute against the ascending side of the said delivery cylinder, a swinging gate adapted to check the excess delivery of material by said cylinder, and an operating member connected to said gate on the delivery side thereof to operate the same through the pressure of excess material delivered thereby.

3. The combination with a chute and a moving delivery wall therefor, of a settling chamber intermediate the chute and said moving wall, a swinging regulating device, a swinging safety gate, and a plurality of inwardly directed projections between which the moving material must pass.

4. The combination with a chute and a movable delivery wall therefor, of means to direct the flow of materials from said chute upon said moving delivery wall in a direction opposed to the movement of said wall, and a swinging member pivoted above the exit from said chute and hanging in the path of the material carried away by the delivery wall so that said member will be actuated by the excess flow of materials over said delivery wall to swing into a position to oppose such excess flow.

5. The combination with a chute and a movable delivery wall therefor, of a settling chamber intermediate the said chute and moving wall out of which chamber the said delivery wall must raise the material in the delivery thereof, and a device controlled by the excess delivery of the material itself upon the moving wall to prevent excess delivery from said settling chamber.

6. The combination with a chute, of a rotary delivery cylinder, a settling chamber intermediate said chute and cylinder and on the ascending side of the latter, and a pivotally mounted plate adapted to be engaged by the excess flow of material from said chamber over said cylinder and thereby to be swung downward toward the cylinder to check such excess flow.

7. In a cement feeding device, the combination with a chute and a moving delivery wall therefor, of a feed regulating device, and cement dividing means projecting toward said moving delivery wall beyond said feed regulating device and between which the material controlled by said wall must pass, whereby there is provided an even and uniform flow of material.

8. In an apparatus of the class described, the combination with a stone hopper, a sand hopper, and a cement hopper, of delivery cylinders arranged beneath said stone and sand hoppers, respectively, to receive the delivery directly therefrom, a swinging safety gate to control the delivery of materials from each of said hoppers by its respective cylinder, a delivery cylinder also beneath said cement hopper but provided with a settling chamber on its ascending side, a deflecting device for deflecting the cement into said settling chamber, a swinging safety gate, also for said cement delivery cylinder, and a regulating device for preventing excess flow between said safety gate and said settling chamber.

9. The combination with a chute, of a rotary delivery cylinder beneath said chute, a settling chamber on the ascending side of the cylinder, a deflector for deflecting material from the chute into the settling chamber, and a swinging safety gate coöperating with the cylinder and on the opposite side of the latter from the settling chamber.

10. The combination with a supplying hopper, of a delivery cylinder onto which the hopper discharges, a deflecting member for directing the discharged material onto the cylinder, and a settling chamber a portion of whose bottom is formed by the rising side of said cylinder opposite the delivery point for said material.

11. The combination with a cement feeding hopper, of a settling chamber connected therewith, a delivery cylinder below the hopper and forming the bottom wall of said chamber, a deflecting and delivery regulating member at the exit from the hopper, and a series of projections extending into the path of the cement to break up the stream thereof as it issues on said cylinder.

12. The combination with a cement feeding hopper, of a settling chamber connected therewith, a delivery cylinder below the hopper and forming the bottom wall of said chamber, and a safety-gate, substantially as specified, for controlling the amount of cement issuing upon said cylinder.

In testimony whereof, I have signed my name to this specification, in the presence of two subscribing witnesses.

FRANK B. GILBRETH.

Witnesses:
    Frederick L. Emery,
    S. Ethel Haynes.

---

Copies of this patent may be obtained for five cents each, by addressing the "Commissioner of Patents, Washington, D. C."